References inside.

L. S. FLATAU.
COFFEE URN.
APPLICATION FILED NOV. 6, 1909.

983,130. Patented Jan. 31, 1911.

Witnesses
Lloyd W. Patch
A. A. Hammond

Inventor
Louis S. Flatau
By Louis Buggs & Co
Attorneys

UNITED STATES PATENT OFFICE.

LOUIS S. FLATAU, OF ST. LOUIS, MISSOURI, ASSIGNOR OF ONE-HALF TO DUDLEY C. WRAY, OF ST. LOUIS, MISSOURI.

COFFEE-URN.

983,130.  Specification of Letters Patent.   Patented Jan. 31, 1911.

Application filed November 6, 1909. Serial No. 526,573.

*To all whom it may concern:*

Be it known that I, LOUIS S. FLATAU, a citizen of the United States, residing at St. Louis, in the State of Missouri, have invented certain new and useful Improvements in Coffee-Urns, of which the following is a specification.

My invention relates to an improvement in coffee urns, and the object is to provide means whereby coffee can be easily made, and coffee grounds confined to a compartment whereby they will not become mingled with the coffee when it is discharged from the urn.

The invention consists in certain novel features of construction and combinations of parts which will be hereinafter described and pointed out in the claims.

Figure 1:
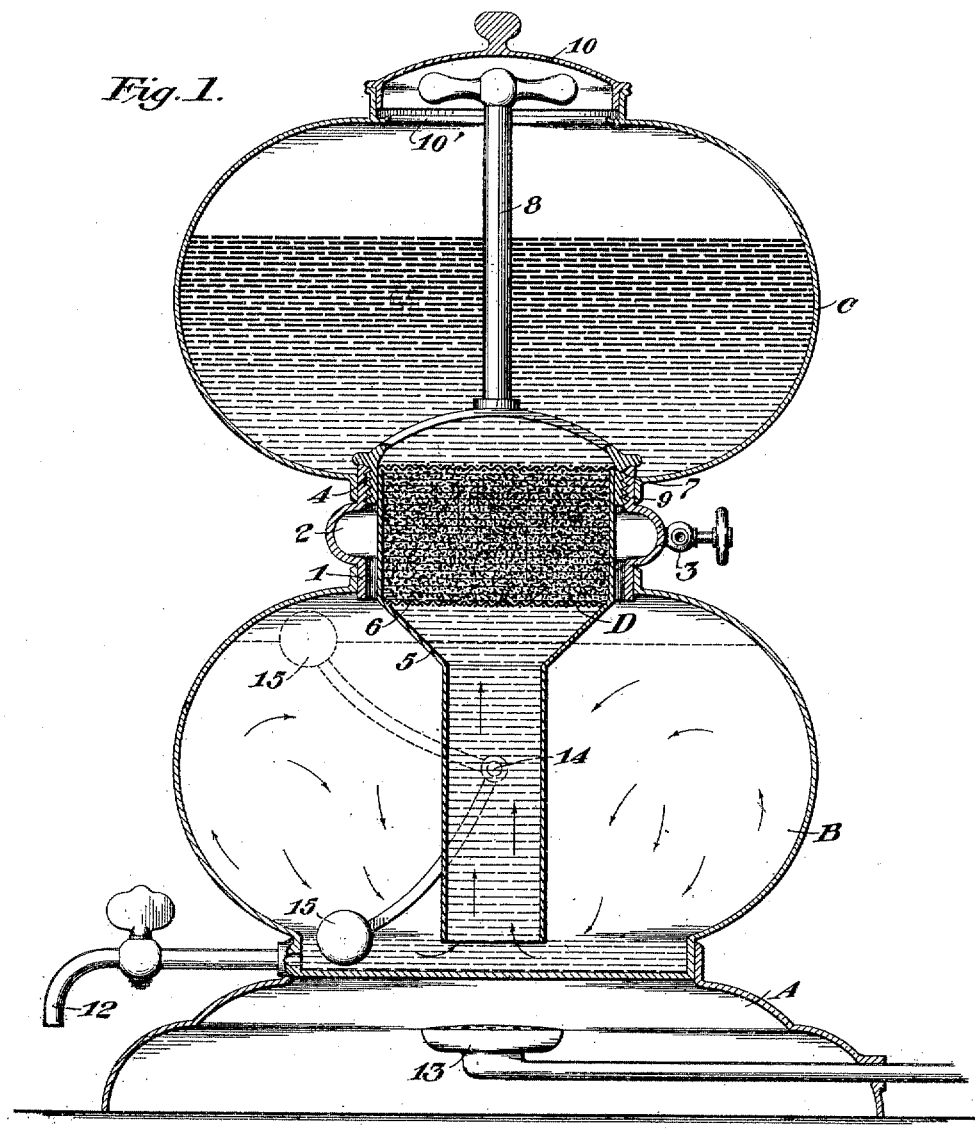
Figure 2:
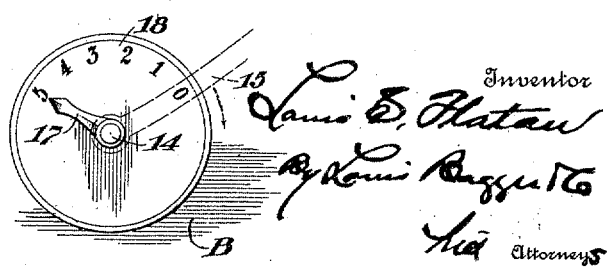

In the accompanying drawings:—Figure 1 is a vertical sectional view of the invention; and Fig. 2 is a detail view.

A represents the base and B the lower chamber or tank. The upper chamber C is connected to the lower chamber B by a ring 1 which is provided with an annular rim 2 which rests upon the upper edge of the lower tank, and upon which the upper chamber is supported. This rim also forms an air chamber, and by the valve 3 in the rim, the air and steam can be discharged. The upper end of the ring 1 is provided with screw threads 4.

The coffee retainer D is preferably funnel-shaped at its lower end, as at 5, and at the upper end of the funnel-shaped portion, a fine gauze strainer 6 is supported upon which the coffee is received. At the upper end of the retainer, a similar gauze strainer 7 is removably mounted, whereby the coffee can be inserted or removed from the strainer. Connected by solder or other means to the outer surface of the retainer is a handle 8, which is provided with screw-threads 9 which are adapted to engage the screw-threads 4 of the ring 1, whereby the retainer is supported within the urn. A cover 10 is mounted upon the chamber C and below the cover, rim 10' is formed, whereby the usual sack which is used in making drip coffee can be supported when it is desired to use the sack instead of the retainer D. A faucet 12 is connected to the chamber B whereby the coffee can be discharged from the chamber, and beneath this chamber, gas burner 13 is formed for heating purposes. A shaft 14 is mounted in the wall of the chamber B, and connected to one end of the shaft is a float 15, which is received in the chamber B, and upon the other end of the shaft is an indicator hand 17, which is adapted to pass over a dial 18, supported on the outer side of the chamber B by the shaft 14. As the contents of the chamber B recede or rise, the float will be operated, which will cause the operation of the hand 17 indicating the amount of liquid within the chamber B.

For making coffee with this invention, the coffee is placed in the retainer, which is then screwed down and supported within the ring 1, making a steam tight joint. The water is placed in the upper chamber C, cold if desired, but by the use of hot water coffee will be made more quickly. The burner 13 is lighted, while the cold water, or even the hot water, is passing through the coffee in the retainer. The water which passes into the chamber B will become heated very readily. In fact, it will heat very fast, for the reason that water will percolate through the coffee very slowly. When the water becomes heated to the boiling point, or steam making, a pressure of low degree is driven down and up through the funnel member 5 and through the coffee, until the seal is broken at the lower end of the funnel member 5, retaining only a sufficient quantity of water to prevent burning the bottom of the chamber B. The water will remain in the upper tank until the valve 3 is opened, or the blaze from the burner turned low. The escapement of the steam at the vent or valve allows the hot water or coffee to run back to the lower chamber, whereby the coffee can be drawn off for use. In this manner the water is driven through the coffee and back again as many times as desired.

Having fully described my invention, what I desire to secure by Letters Patent is:

1. A coffee urn comprising two chambers, a ring supported upon one chamber, an annular rim on the ring for supporting the other chamber, a valve in the ring for allowing the discharge of steam, and a retainer supported in the chambers of less diameter than the ring, whereby space is formed between the retainer and ring for admission of steam to be discharged by the valve in the ring.

2. A coffee urn comprising two chambers, a ring connecting the two chambers together, a coffee retainer, a handle connected to the retainer and said handle having screw-threaded engagement with the ring for supporting the retainer in the urn.

3. A coffee urn comprising two chambers, a ring received between the chambers, a valve in the ring for allowing the discharge of steam, and a retainer supported in the chambers of less diameter than the ring whereby a space is formed between the ring and retainer for forming a passage for steam to the valve.

4. A coffee urn comprising two chambers, a ring connecting the two chambers, a retainer received in the chamber, a handle connected to the retainer, and means for connecting the handle to the ring for supporting the retainer.

5. A coffee urn comprising two chambers, a ring connecting the two chambers, a retainer received in the chamber, a handle connected to the retainer, means for connecting the handle to the ring for supporting the retainer, an indicator, and a float connected to the indicator for registering the contents of one of the chambers.

In testimony whereof I affix my signature, in the presence of two witnesses.

LOUIS S. FLATAU.

Witnesses:
 E. OBERLE,
 F. T. BOKEM.